No. 77,562.  
PATENTED MAY 5, 1868.

P. C. YOST.  
CORN HARVESTER.

Witnesses:  
Inventor:

United States Patent Office.

PETER C. YOST, OF HAMILTON, ILLINOIS.

*Letters Patent No. 77,562, dated May 5, 1868.*

IMPROVEMENT IN CORN-HARVESTERS.

*The Schedule referred to in these Letters Patent and making part of the same.*

TO ALL WHOM IT MAY CONCERN:

Be it known that I, PETER C. YOST, of Hamilton, Hancock county, Illinois, have invented a new and improved Corn-Harvester; and I do hereby declare that the following is a full, clear, and exact description thereof, which will enable others skilled in the art to make and use the same, reference being had to the accompanying drawings forming part of this specification.

This invention relates to an improved machine for cutting and gathering the stalks of Indian-corn, and consists of a knife, of peculiar construction, mounted on a cross-beam on a sled, the corn being fed to the knife between two hooks, one of which serves to catch the corn, and the other prevents it from lodging in front of the beam, and guides the knife.

An apron or cradle receives the corn when cut, whence it is thrown upon the sled.

In the accompanying drawings—

Figure 1:
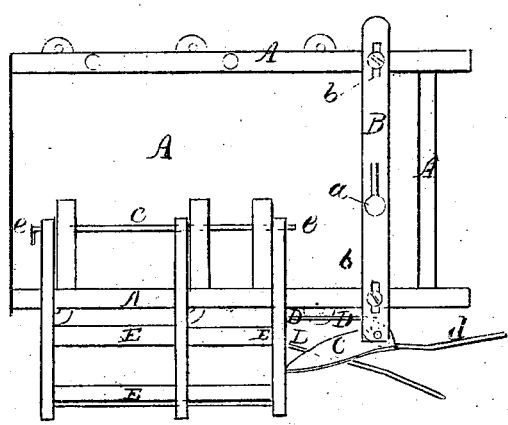

Figure 1 is a top view, and

Figure 2:
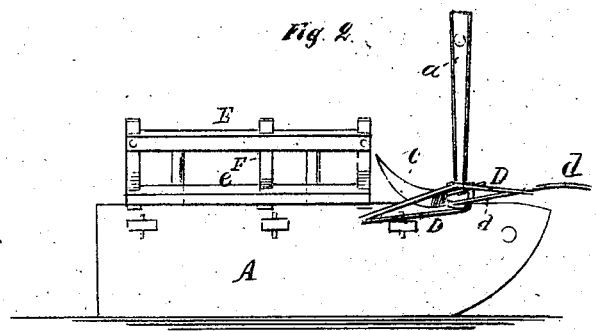

Figure 2 a side view of my improved corn-harvester.

Similar letters of reference indicate corresponding parts.

A A is the sled, on which my improved apparatus is carried, and $a$, a support for the driver, carried on the cross-piece B, which is secured to the framework of the sled A by bolts passing through the slots $b\ b$.

The knife C is fastened in the end of the cross-piece, its blade pointing to the rear, and having a spiral bend, something like the blade of a screw-propeller, the cutting-edge directed upwards and outwards.

Outside the slot, in the cross-piece, and to the under side thereof, the two hooks, D $d$, are attached, whereof D catches the corn and $d$ prevents it from falling in front of the cross-piece B, and guides it to the knife C.

The use of slots $b$, in the cross-piece B, is to regulate the lay-over of the knife to suit the furrow or ridge according to the nature of the ground.

E is an apron or cradle, hung on the bar $e$, which receives the corn as it is cut, and when full is tilted over by the driver, whereby the corn is thrown upon the sled. This apron can also be applied to mowing-machines.

Having thus described my invention, I claim as new, and desire to secure by Letters Patent—

1. The form and configuration of the knife C, as applied to a carriage or sled for reaping, substantially as described.

2. The slotted adjustable beam B, carrying the knife C and hooks D $d$, substantially as and for the purposes described.

3. The apron E, to catch the corn or grass, as applied to a carriage or sled for reaping or mowing, substantially as described.

PETER C. YOST.

Witnesses:
 JOHN C. LEFLER,
 H. G. STRONG.